United States Patent [19]
Ballman

[11] 3,819,994
[45] June 25, 1974

[54] TIME RESPONSIVE STARTING SWITCHES

[76] Inventor: Gray C. Ballman, 30 Portland Dr., St. Louis, Mo. 63131

[22] Filed: Mar. 14, 1973

[21] Appl. No.: 341,233

[52] U.S. Cl. ............................. 318/221 E, 318/227
[51] Int. Cl. ............................................. H02p 1/44
[58] Field of Search ............ 318/221 R, 221 E, 227

[56] References Cited
UNITED STATES PATENTS

| | | | |
|---|---|---|---|
| 3,519,911 | 7/1970 | Frank | 318/227 X |
| 3,530,348 | 9/1970 | Conner | 318/227 X |
| 3,740,631 | 6/1973 | Fricker et al | 318/221 E |
| 3,746,951 | 7/1973 | Hohman | 318/221 E |

Primary Examiner—Gene Z. Rubinson
Attorney, Agent, or Firm—Joseph A. Fenlon

[57] ABSTRACT

I have invented an instantaneously resettable starting switch for use in single phase electrical motors which switch provides a capacitor to develop a d-c charge upon the application of external power to the motor, and utilizes the charge of said copacitor to supply power to the start winding of said motor for a finite period of time, after which time a time responsive control circuit discharges the capacitor instantaneously, separating the start winding from the external power, holding the start winding separated so long as external power continues to be supplied, and instantaneously resetting itself when external power is cut off.

6 Claims, 1 Drawing Figure

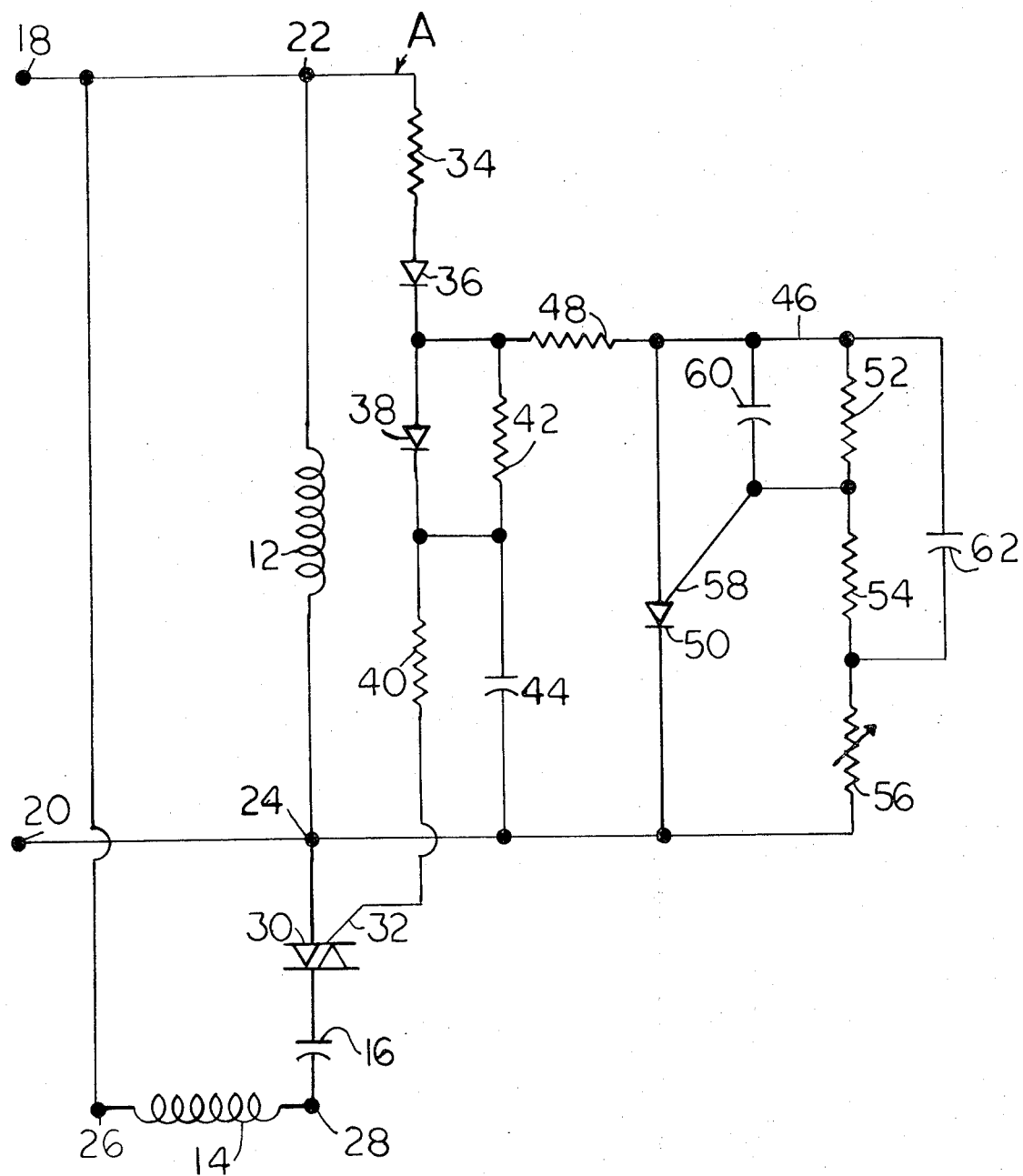

TIME RESPONSIVE STARTING SWITCHES

It is the object of this invention to provide a starting switch for use in supplying electrical power to a start winding in a rotating electrical device and which cuts off the supply of such power after the elapse of a selectable period of time.

With the above and other objects in view, which will become immediately apparent upon reading this specification, my invention resides in the unique and novel form, construction, arrangement and combination of the various elements shown in the drawings, described in the specification and claimed in the Claims.

IN THE DRAWING:

The FIGURE represents an electrical schematic diagram of a preferred embodiment of my invention.

Referring now in more detail and by reference character to the drawings which illustrate a preferred embodiment of my invention, A designates a starting switch for a single phase motor which includes a run winding 12, a start winding 14, power terminals 18 and 20 through which electrical power is supplied when the motor is desired to operate, and winding terminals 22, 24, 26 and 28, as shown.

The circuit A comprises a capacitor 16 and a Triac 30 interposed in series between the terminals 24, 28; the operation of the Triac 30 is conventionally controlled by a gate lead 32. Interposed between the terminal 18 and the gate lead 32 in series is a first resistor 34, a first diode 36, a second diode 38 and a second resistor 40. Connected across the second diode 38 is a resistor 42 and connected between the terminal 20 and the common connection of the diode 38 and the second resistor 40 is a capacitor 44.

Connected in parallel across the resistor 42 and the capacitor 44 is a control circuit 46 comprising a resistor 48 in series with an SCR 50, and resistors 52 and 54 and adjustable resistor 56 is series with each other and in parallel with the SCR 50. The gate lead 58 of the SCR 50 is connected to the common connection of the resistors 52 and 54 and a capacitor 60 is connected in parallel with the resistor 52. A capacitor 62 is connected across the two resistors 52 and 54 as shown.

OPERATION

The windings 12 and 14 are conventional, run winding 12 being continuously connected across line terminals 18, 20, and start winding 14 being adapted for intermittent supply of starting power to the motor when power is first supplied to the terminals 18, 20. The Triac 30 functions as a switch to control the occasions when electrical current passes through the start winding 14.

Operation of the Triac 30 is controlled by the voltage presented to the gate lead 32, which is substantially the voltage across the capacitor 44. When a sufficient charge has developed across capacitor 44, the Triac 30 will fire and start winding 14 will be carrying starting current. When Triac 30 is not in conduction, operating current will flow only through run winding 12, assuming power is present across terminals 18, 20.

The circuit which controls the voltage present across capacitor 44 includes resistor 34, diode 36, resistor 42 with diode 38 in parallel thereto, and the capacitor 44, all connected across the terminals 18, 20. Although that circuit appears to be half-wave in nature, it will become immediately apparent that this circuit functions during the full wave.

The control circuit 46 senses, through resistor 48, the voltage across capacitor 44 and resistor 42. When the motor is stopped and power is applied across terminals 18, 20, to start the motor running, the capacitor 44 will begin to charge during each positive half cycle, the rate of charge being determined by the magnitude of resistor 34. The blocking diode 36 prevents the capacitor 44 from discharging during each negative half-cycle. The charge developed across capacitor 44 is presented to control circuit 46 through the resistor 42. The resistor 34 is sized of such magnitude that the capacitor 44 will almost instantaneously develop a charge sufficient to fire the Triac 30, whereby power is immediately supplied to the start winding 14.

It will be here noted that SCR 50 does not commence conduction when capacitor 44 commences charging. It is only when a turn-on voltage is present at gate lead 58 that SCR 50 will go into conduction. Once SCR 50 goes into conduction, capacitor 44 will discharge through resistors 42 and 48 and the SCR 50. Resistor 42 is sized of sufficient magnitude to prevent capacitor 44 from discharging immediately upon the firing of SCR 50, and the Triac 30 is held in conduction for a predetermined time after SCR 50 fires. After that predetermined time, the Triac 30 turns off and the motor operates exclusively from power supplied to run winding 12 from terminals 18, 20.

The resistance 56 may be varied selectively to regulate the amount of time required for capacitors 60 and 62 to develop charges sufficient for SCR 50 to go into conduction. Once SCR 50 is in conduction, its anode will be only slightly higher than its cathode in potential and capacitors 44, 60 and 62 will each discharge through SCR 50 while SCR 50 remains in conduction. SCR 50 is held in conduction by the circuitry until power is removed from terminals 18 and 20, at which time the switch A will have been reset by the discharge of capacitors 44, 60 and 62, and ready for reactivation upon receipt of an external command which resupplies power to terminals 18 and 20.

The following table presents suggested values for the various elements in my working embodiment of my invention:

| RESISTORS (Ohms) | CAPACITORS (microfarads) |
|---|---|
| R 34 — 8.2K | C 44 — 5 |
| R 40 — 1.8K | C 60 — 0.047 |
| R 42 — 220K | C 62 — 3 |
| R 48 — 220 | |
| R 52 — 220K | |
| R 54 — 1.8M | |
| R 56 — 0–390K | |

It should be readily apparent that a pair of the switches A may be used on the appropriate windings of a reversible motor to achieve an instantaneously reversible motor with instantaneously resettable control switches which operate purely on the basis of elapsed time and are independent of motor velocity or winding current. It is believed these switches are the pioneers of this type of switch.

Various changes and substitutions for the elements shown herein may be made without departing from the nature and principle of my invention, which is set forth in the following Claims.

I claim:

1. An electrical switch for use with an electrical motor having a start winding and a run winding and adapted to operate upon application of external power to a pair of its terminals across which said run winding is connected, said switch comprising a Triac having its major leads connected in series with said start winding across said terminals and also having a control lead, a voltage sensing circuit including first and second resistors in series with a first diode and a first capacitor, the first capacitor being connected at one plate to one of the terminals and at the other plate to the second resistor and to the control lead, a second diode connected in parallel with the second resistor and connected in the voltage sensing circuit with the same polarity as the first diode, and a timing and resetting circuit connected in parallel with the second resistor and the first capacitor and including third, fourth and fifth resistors in series with a variable resistor, a second capacitor in parallel with the fourth resistor, a third capacitor in parallel with the fourth and fifth resistors and an SCR having its anode and cathode connected in parallel with the fourth and fifth resistors and the variable resistor, the gate lead of said SCR being connected between the fourth and fifth resistors.

2. The device of claim 1 in which the variable resistor is sized of sufficient magnitude to delay the charging of the third capacitor for a substantial period of time whereby to assure the power applied to the start winding has brought the motor up to operating speed.

3. The device of claim 2 in which the fifth resistor is substantially larger than the fourth resistor and the variable resistor whereby to assure the third capacitor retains its attained charge when the SCR is in conduction.

4. An instantaneously reusable electrical switch for use with an electrical motor having a start winding and a run winding and adapted to operate upon application of external power to a pair of its terminals, said run winding being connected across said terminals, said switch comprising first normally non-conducting switching means in series with said start winding across said terminals and adapted for supplying current to the start winding when in receipt of a bias voltage to a control lead, and control means for supplying said bias voltage to the first control lead for a predetermined period of time when external power is applied to said terminals, for cutting off the supply of bias voltage to said control lead after the elapse of such period of time, for holding the supply of bias voltage from the control lead thereafter so long as external power continues to be applied to said terminals, and for automatically resetting itself so that bias voltage is immediately reapplied to said control lead instantaneously upon reapplication of external power to said terminals once the external power has been removed therefrom, said control means comprising a rectifier connected between one of said terminals and a node, a first capacitor connected between said node and the other of said terminals, second switching means connected in parallel with said first capacitor between said node and said other terminal and including a gate lead through which said second switching means may be biased into conduction, and time responsive means also connected between said node and said other terminal for monitoring the charge of the first capacitor, and for after the elapse of a predetermined period of time transferring a turn-on voltage to the gate lead for placing said second switching means in conduction, said time responsive means including means for holding said second switching means in conduction so long as external power continues to be applied across said terminals, and said second switching means including means for removing the bias from the first capacitor when the second switching means is in conduction.

5. The device of claim 4 in which the three responsive means includes first, second and third resistors in series with each other and in parallel with said second switching means, a second capacitor in parallel with the first resistor, and a third capacitor in parallel with the first and second resistors, and the gate lead is connected to the junction of the first and second resistors and the second capacitor.

6. The device of claim 5 in which the third resistor is variable for providing selectable time variations in the time required for the triggering of the second switching means.

* * * * *